United States Patent [15] 3,638,481
Wilner [45] Feb. 1, 1972

[54] PRESSURE SENSOR
[72] Inventor: Leslie B. Wilner, Palo Alto, Calif.
[73] Assignee: Becton Dickinson Electronics Company, Pasadena, Calif.
[22] Filed: Mar. 4, 1969
[21] Appl. No.: 804,066

[52] U.S. Cl. ............... 73/141 A, 73/88.5 SD, 73/301, 73/398 R, 338/4
[51] Int. Cl. .......................... G01l 1/22, G01b 7/16
[58] Field of Search .......... 73/301, 398 R, 88.5 SD, 141 A; 338/4

[56] References Cited

UNITED STATES PATENTS

| | | | |
|---|---|---|---|
| 3,102,420 | 9/1963 | Mason | 73/88.5 SD |
| 3,242,731 | 3/1966 | Colgan | 73/301 |
| 3,325,761 | 6/1967 | McLellan | 73/398 R X |
| 3,341,794 | 9/1967 | Stedman | 73/398 R X |
| 3,402,609 | 9/1968 | Chiku et al. | 73/88.5 SD |
| 3,456,226 | 7/1969 | Vick | 73/88.5 SD |
| 3,392,576 | 7/1968 | Hollander | 73/88.5 SD |
| 3,411,361 | 11/1968 | McLellan | 73/398 R |
| 3,461,416 | 8/1969 | Kaufman | 73/398 R X |

Primary Examiner—Louis R. Prince
Assistant Examiner—Frederick Shoon
Attorney—Reed C. Lawlor

[57] ABSTRACT

A pressure sensor is provided with a resilient diaphragm responsive to pressure which produces a corresponding actuating force on a unitary piezoresistive semiconductor element which is prestressed to exhibit a conductance that is a linear function of the actuating force over an extended range of compression forces so that electrical signals produced by the pressure sensor are a linear function of the applied pressure or force.

11 Claims, 9 Drawing Figures

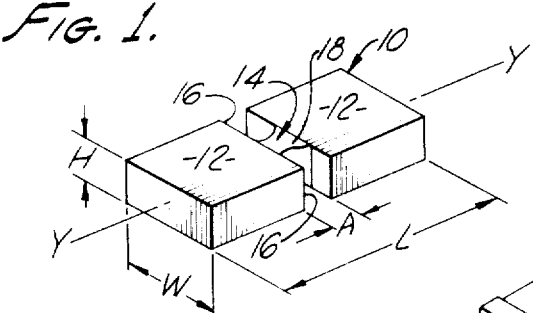
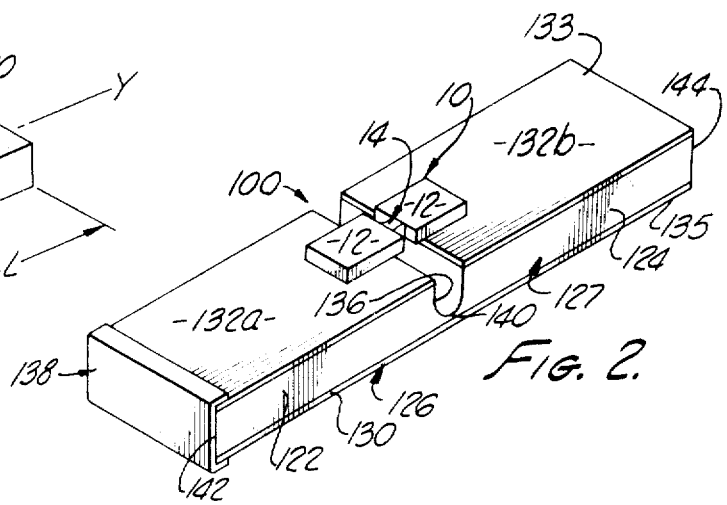
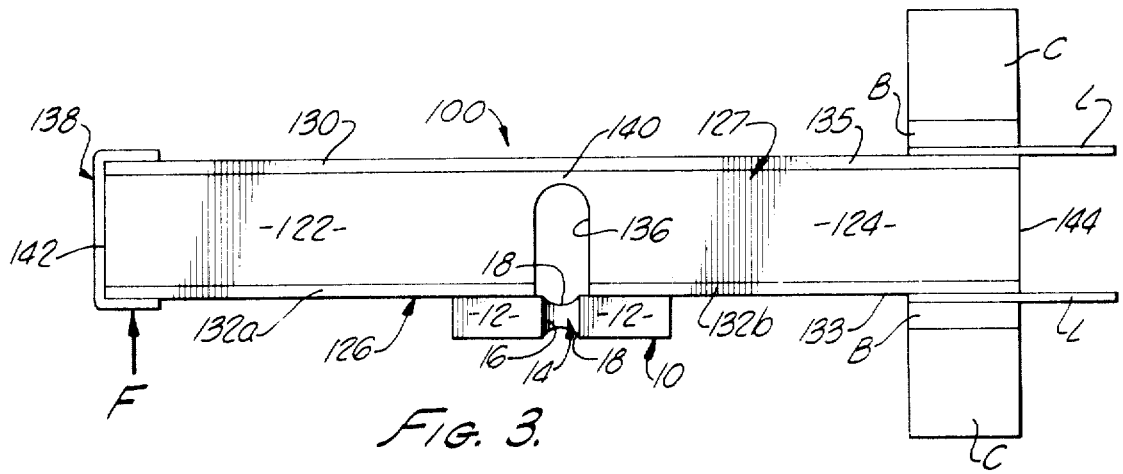
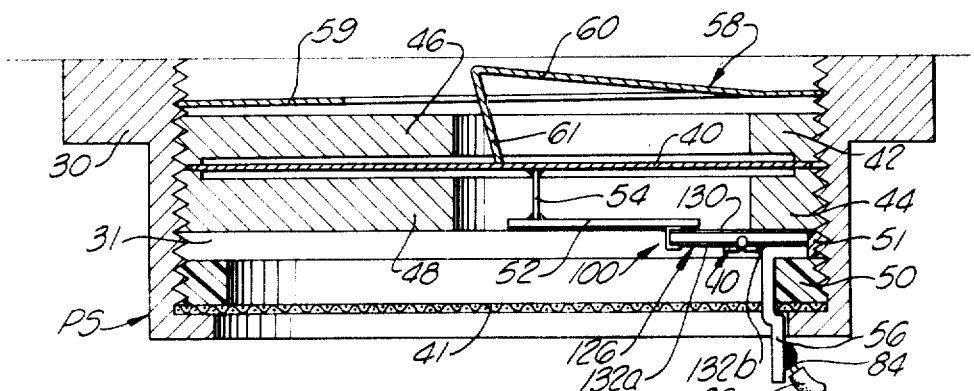
INVENTOR
LESLIE B. WILNER
BY
ATTORNEY

PATENTED FEB 1 1972
3,638,481
SHEET 2 OF 2
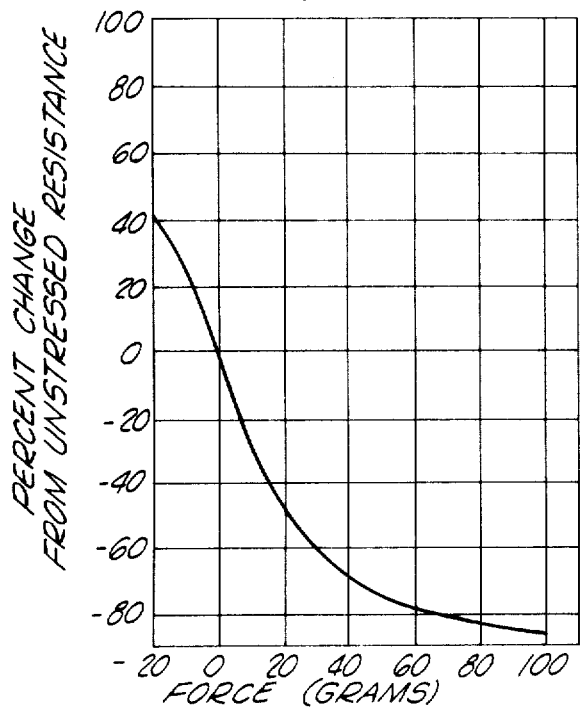
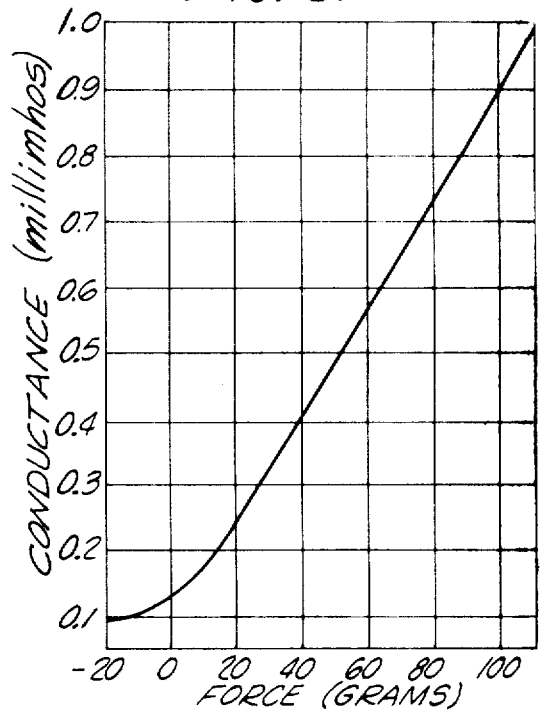
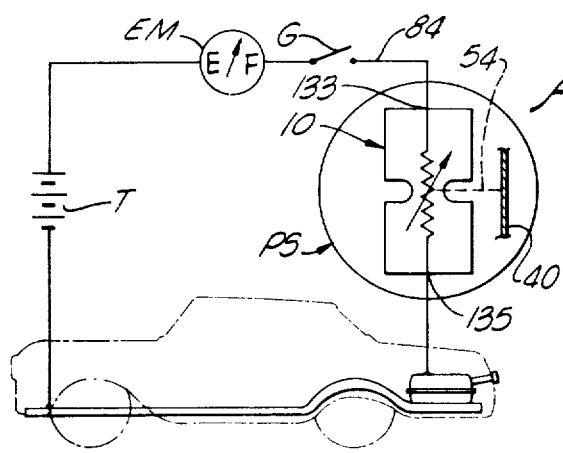
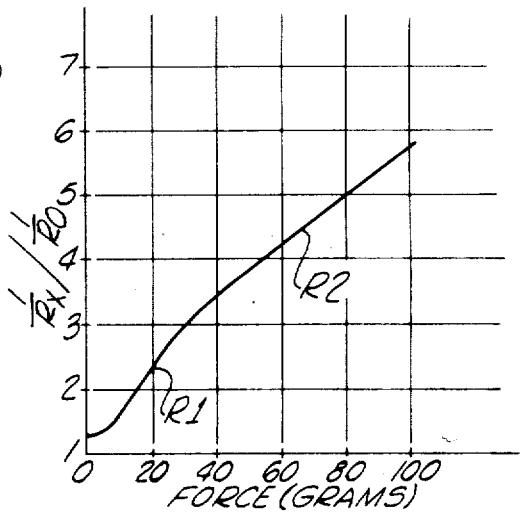
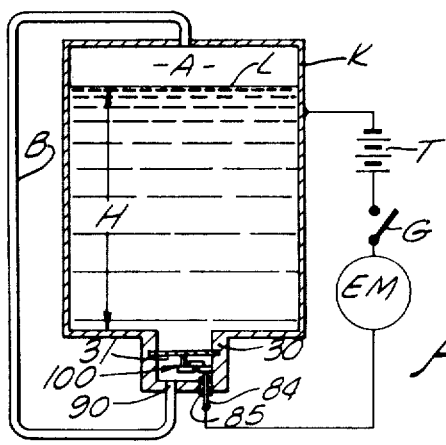
INVENTOR
LESLIE B. WILNER
BY
Reed C. Lawlor
ATTORNEY

PRESSURE SENSOR

Cross References To Related Applications
Patent application, Ser. No. 421,869, filed Dec. 29, 1964, now Pat. No. 3,501,732.
Patent application, Ser. No. 804,185, filed Mar. 4, 1969.

This invention relates to improvements in devices for measuring changes in physical phenomena and particularly to devices in which the change in the phenomenon undergoing investigation produces a force that is capable of moving a mechanical element. The invention resides particularly in an improved system for utilizing a unitary piezoresistive semiconductor element that responds to motion of such element.

Heretofore unitary piezoresistive semiconductive devices have been embodied in transducers in such a way that a change in resistance of the piezoresistive element is about proportional to the magnitude of the applied force. Such transducers are linear in resistance over only a small range in the neighborhood of zero force. In such transducers that have been employed heretofore, the change in resistance is detected by a device which measures a change in electric potential produced across the transducer while the current through the transducer is maintained substantially constant. Since the range of linearity of change in resistance with force is small, being of the order of 2 to 1, the changes in voltage that are detectable over a linear range are also small compared with the total voltage across the piezoresistive element.

I have discovered new ways of designing and constructing semiconductor piezoresistive transducers in which the useful linear range of the signal produced is much larger, being 5 to 1 or better. My invention is based upon my discovery that the change in conductance of a semiconductor piezoresistive transducer is linear over an extended force range outside the range in which the change in resistance is linear. In some cases, it is found that more than one linear range of conductivity versus force exists. It should be understood that a range may be either defined by known boundaries or by one known boundary and one that is unknown.

According to my invention, a semiconductive piezoresistive element is prestressed, as by means of a manually adjustable spring, to establish the conductance of the piezoresistive element at a point within such a linear range, means are provided for applying a force to the piezoresistive element to change the force on the element from one point in that range to another point in that range, and means including a constant voltage source and a current-measuring device in series therewith to measure the change in current flowing through the piezoresistive element caused by the applied force.

The invention is particularly applicable to gasoline-gauging systems for motor vehicles and for this reason will be described with particular reference thereto.

The principles underlying the invention, and an embodiment of the invention illustrating its application to a gasoline-gauging system for automobiles, are set forth in the following description taken in connection with the accompanying drawings where:

FIG. 1 is an isometric view of a piezoresistive semiconductor element of a type used in this invention;

FIG. 2 is an isometric view of electrosensitive unit employed in the invention;

FIG. 3 is a schematic view of an arrangement employed in determining how the electrical characteristics of the piezoresistive element varies with the force applied;

FIG. 4 is a graph showing how the resistance of the piezoresistive element varies with the applied force;

FIG. 5 is a graph showing how the conductance of the piezoresistive element varies with the applied force;

FIG. 6 is a graph showing how the conductance of another piezoresistive element varies with the applied force;

FIG. 7 is a sectional view of a pressure sensor embodying this invention;

FIG. 8 is a wiring diagram of a gasoline-gauging system employing the invention; and FIG. 9 is a diagram of sealed system for measuring the head of a liquid in the system.

As mentioned above, my invention is based upon certain discoveries that I have made regarding the electrical properties of piezoresistive semiconductive devices. An electrosensitive unit 100 of a type utilized in the invention as illustrated in FIG. 2 employs a piezoresistive element 10 having a pair of pads 12 interconnected by a reduced neck 14. The pads 12 are ohmically bonded to electrodes 132a and 132b on the upper surface of support arms 122 and 124. Support arms 122 and 124 of the support member 126 are interconnected by means of a leaf-spring hinge 140. The piezoresistive element 10 is of the general type described and claimed in U.S. Pat. No. 3,351,880. Electrosensitive element 100 is of the type described and claimed in copending application, Ser. No. 421,869, now U.S. Pat. No. 3,501,732. Both the aforesaid patents have been assigned to the same assignee as the present patent application.

The discovery upon which this invention is based was made during the course of testing a unitary piezoresistive element 10 employing a special material. In making these tests, it was discovered that the conductance of a piezoresistive element varies as a linear function of the force applied longitudinally thereto over a very wide range. Later it was discovered that this property is common to other materials. Before describing tests that were made, it is desirable to describe the piezoresistive element 10 and the electrosensitive unit 100 in somewhat greater detail.

The piezoresistive element 10 is in the form of a very small elongated block of semiconductive material having a reduced neck or Euler column 14 of smooth hourglass configuration separating two enlarged pads 12. The piezoresistive element illustrated is formed from a rod or block of rectangular cross section. The element has an overall length L of about 0.19 cm., overall width W of about 0.06 cm. and a thickness H of 0.013 cm. The pads are of square configuration as viewed from the top, being about 0.07 cm. on each side. The reduced neck is formed by means of a pair of opposed notches 16 that lie on opposite sides thereof and by a second pair of notches or grooves 18 on the upper and lower sides thereof. The notches 16 have semicylindrical surfaces at their inner ends. The radii of these surfaces is about 0.01 cm. As a result, the reduced neck has a cross section of about 0.015 cm. × 0.002 cm., the smallest section having an area of about 0.00003 cm.² . The neck is generally oval or rectangular cross section. The neck is joined by outwardly flaring portions connecting the neck to the pads.

In effect, the portion of the piezoresistive element of FIG. 1 that lies between the pads is an Euler column of stubby smooth hourglass configuration that is free of any lateral support. The length A of the neck, that is, the distance between the pads, is somewhat greater (about five times greater) than the minimum thickness of the neck, that is, the thickness at its narrowest portion. In any event, the length of the neck relative to its thickness is less than that length which could result in buckling.

Various kinds of semiconductor piezoresistive material may be employed in the unitary piezoresistive element 10. The most satisfactory materials are materials such as a silicon that has been doped with a small proportion of boron.

In some cases, it is desirable to diffuse some other doping material into the body or onto the surface of the piezoresistive element. The material which has been found most useful in this invention and which so far is believed to be unique consists of a boron-doped silicon crystal into which gold has been diffused throughout. One special material referred to hereinafter utilized boron-doped silicon material which had a resistivity of 3 ohm-cm. at room temperature prior to gold diffusion.

In practice, it is found that the desired linearity of conductance can be achieved by diffusing gold into such material in an amount such that the resistivity of the final material lies within a wide range such as in a range from 6 ohm-cm. to 100 ohm-cm. However, such material having a resistivity of about 12 ohm-cm. is best because this material has a temperature coefficient which is nearly zero. Suitable semiconductive material may also be produced by starting with boron-doped silicon having a conductivity of some value other than 3 ohm-cm.

The semiconductor materials that have been employed are in the form of single crystals of such material oriented with the [111] plane transverse to the longitudinal axis Y—Y of the piezoresistive element 10 or with the [100] plane so oriented. In the first orientation [111] the piezoresistive element has a linear conductive characteristic when under compression. In the second orientation [100] the element has a linear conductive characteristic when under tension. The first orientation is the better because the breaking (crushing) strength under compression exceeds the breaking (tensile) strength under tension.

In the manufacture of the piezoresistive element the entire element is oxidized in a high-temperature steam and argon atmosphere so that it becomes encased within a thin glass sheath. Except for this sheath, the final element consists of a single crystal of semiconductor piezoresistive elements. Portions of the glass sheath are removed and metallized with a suitable metal, such as nickel, where required, to make electrical contacts with the electrodes 132a and 132b of the support member 126.

The support member 126 of the electrosensitive unit 100 of FIG. 2 is formed of a laminated bar that consists of a central body or substrate 127 composed of insulating material sandwiched between two layers or sheets of conductive material such as copper. In a practical embodiment of the invention, the support member has a length of about 0.4 inch, a width of about 0.06 inch, and a thickness of about 0.02 inch. The insulating material forming the substrate or intermediate layer of the laminate is preferably a hard, stiff insulating material, such as an alumina high-strength ceramic or devitrified glass or the like, which is resistant to deformation or destruction at temperatures at which soldering is performed.

To provide two support arms 122 and 124, support bar 126 is cut crosswise midway of its length to form a deep groove 136. The groove 136 cuts the upper metal sheet into two separate segments 132a and 132b. The lower metal sheet remains intact forming an electrode 130. In this process a maximum amount of the substrate material at the groove 136 is removed to provide a thin hinge 140 which has a stiffness of less than 1/10 of the stiffness of the entire support bar 126. A jumper 138 connects the electrodes 132a and 130 at one end of the support bar.

The nickel-coated portions of the piezoresistive element are soldered to the metal segments 132a and 132b thereby forming electrical contacts between the element 10 and the metal segments. The element 10 is positioned on the support bar 126 so that the neck 14 of the element is in line with the neck 140 of the support bar.

The segment of the electrode layer 132b at the end 144 of the support bar 126 remote from the jumpered end 142 forms one electrical terminal, or electrode, 133 and one end of the other electrode layer 130 at the end 144 of the support bar 126 forms a second electrical terminal, or electrode 135 of the electrosensitive unit 100. The two terminals 133 and 135 are thus electrically connected to opposite ends of the piezoresistive element 10. Thus, an electrosensitive unit 100 is formed which is provided with two relatively pivotable arms 122 and 124 joined by a Cardan, that is, leaf spring, hinge 140 at the lower surface thereof and which is provided with a piezoresistive element 10 that is subjected to stress in accordance with the relative rotation of the two arms.

In order to make electrical tests for determining the properties of the piezoresistive element 10, the support arm 124 bearing the two electrical terminals 133 and 135 is firmly mounted between clamp elements C and insulated therefrom by means of insulating strips B, as indicated in FIG. 3. Electrical leads L connected to the terminals 133 and 135 are connected to suitable electrical measuring devices for determining the current flowing through them or the voltage appearing across them.

To measure the manner in which the electrical properties of the piezoresistive element 10 vary, a force F is applied in a vertical direction, either upwardly or downwardly, to the free or unclamped end of the electrosensitive unit 100, that is, the end 142 which bears the jumper 138. A force F is considered positive if the piezoresistive element is subjected to compression and negative if it is subjected to tension.

FIG. 4 represents the manner in which the total resistance of the piezoresistive element 10, composed of the special material, varies as a function of the force F. It is to be noted that the resistance is linear over a range of about 50 percent of the static or unstressed resistance, that is, the resistance when the force F is zero. But when the force is greater, either in the tension mode or in the compression mode, the resistance varies in a very nonlinear manner as a function of force.

Such a device is very useful for measuring forces when employed with circuitry in which changes in voltage across the electrodes 132a and 132b are detected, provided that the change in resistance is restricted to the range from about +20 percent to about −30 percent of the unstressed resistance.

Being curious about the nature of the variation in resistance with the force in the nonlinear range, I replotted the data in terms of the reciprocal of the resistance, that is, in terms of conductance. The results for the compression range are shown in FIG. 5. The fact that the conductance of the piezoresistive element 10 turned out to be linear over a wider range than that in which the resistance is linear was unexpected.

It will be noted that the range of linearity of resistance extends from a range of −30 percent to about +20 percent (or about 70 percent to about 120 percent). But the range of linearity of conductance is much larger.

Thus, the ratio of resistance at the upper and lower ends of the linear range of resistance shown in FIG. 4 is less than about 1¾ to 1. But the ratio of conductance values at the extreme ends of the linear range represented in FIG. 5 is 5 to 1 or greater. The crushing point (under compression) corresponds to about 120 grams.

It should be understood that linearity is commonly defined in terms of the closeness of a curve to a straight line. This is expressed as the maximum deviation of any point on the curve from a corresponding point on a straight line joining the ends of the curve. End point linearity refers to the linearity of the curve between zero and maximum scale and is usually expressed as a percentage of full-scale output. For example, the curve of FIG. 4 has a maximum deviation from a straight line drawn between −8 and +12 grams of 1. Since the corresponding full scale output is 50 (−30 to +20), this curve has a linearity of 2 percent. In comparison, the curve of FIG. 5 has a maximum deviation from a straight line drawn between 10 and 100 grams of 0.15. Since full scale is 8.25 (1.75 to 10), this curve has a linearity of 1.82 percent.

The foregoing measurements apply to a piezoresistive semiconductor element 10 that is gold-diffused as described above. This particular material is the best that has been found to date. It exhibits such a high-conductance ratio (over 5) at the extreme ends of the linear range. However, other materials also exhibit the linear conductance property described.

The graph of FIG. 6 represents how the conductance varies as a function of applied force when the piezoresistive element 10 is composed of the original boron-doped silicon prior to treatment by gold diffusion. In this case, it is to be noted that there are two linear ranges, R1 and R2.

To make optimum use of the discovery underlying this invention, the piezoresistive element 10 is prestressed by means of a resilient member such as a spring, or otherwise, in order to apply a stress to the element 10 corresponding to a force within the linear range that is to be utilized. It may also be prestressed by virtue of its mounting or otherwise.

A pressure sensor employing this invention is illustrated in FIG. 7. This pressure sensor is employed for indicating the amount of gasoline in the gasoline tank of an automobile.

The pressure sensor PS itself comprises a piezoresistive semiconductor element 10 mounted within a housing 30 having a flexible diaphragm 40 in one wall thereof mounted in the bottom wall of the gasoline tank and exposed to the gasoline therein. The diaphragm 40 is horizontal and adjacent to the bottom wall of the tank and the housing 30 of the pressure sensor extends downwardly therefrom.

The pressure sensor is mounted in the bottom wall of the gasoline tank with the diaphragm exposed directly to the gasoline, thereby subjecting it to the pressure of the overlying liquid established by the hydrostatic head of the gasoline. The gasoline tank has an air vent, such as a perforated cap at the top, exposing the gasoline to atmospheric pressure. The lower part 41 of the housing 30 is perforated, exposing the lower side of the diaphragm 40 to the atmosphere. For this purpose, a fine-mesh plastic screen 41 capable of excluding the passage of dirt, stones and debris but allowing the free passage of air, may be utilized. As a result, the effects of changes in atmospheric pressure are balanced out and the deflection of the diaphragm 40 depends only on the hydrostatic head, or height, of the gasoline directly above the diaphragm 40. The pressure sensor is mounted in the center of the bottom wall of the gasoline tank so that the pressure applied to the diaphragm 40 remains substantially the same even though the tank be slightly tilted one way or another relative to a horizontal plane.

The diaphragm 40 is clamped at its circumference between an upper ring 42 and a lower ring 44. The rings 42 and 44 threadibly engage the housing, and thread sealant or epoxy cement are applied to the threads to provide a seal sufficient to eliminate leakage of gasoline from within the gasoline tank. The rings 42 and 44 are constructed with an eccentric aperture so that one side of the rings 42 and 44 provide stops 46 and 48 spaced from the diaphragm 40. The stops 46 and 48 limit movement of the diaphragm 40 so that the motion of the gasoline within the tank will not cause the diaphragm 40 to stretch beyond its yield point, thereby causing a rupture of the diaphragm 40 and a failure of the pressure sensor PS. The ring 44 and the housing 30 are both constructed of an electrically conductive material in order that current may be conducted, as will be described hereafter.

One end of the electrosensitive element 100 is clamped between rings 44 and 50. Ring 50 and stop 51 are composed of an electrically insulating material. An extension arm 52 is secured to and extends from the other end of the electrosensitive element 100 toward the center of the diaphragm 40. A connector pin or link 54 is welded or cemented at one end to the lower side of the diaphragm 40 and at the other end to the extension arm 52 that bridges to the innermost end of the element 100. The sensitivity of the pressure sensor PS is determined by varying the position of the connector pin 54 on the diaphragm and the beam before final mounting.

In a specific embodiment of the invention the diaphragm 40 has a stiffness of about one-fourth that of the beam that consists of the support 126 and the extension arm 52. In other words, one-fourth as much force is required to deflect the diaphragm alone by a particular distance such as 0.005 inch when the force is applied at the center of the diaphragm as would be required to deflect the end of the beam that same distance. Furthermore, in this particular embodiment of the invention the stiffness of the spring 58 is less than about one-tenth of the diaphragm and beam together. In other words, the spring 58 is more compliant than the diaphragm 40 and beam together. With this arrangement, the sensitivity of the pressure sensor may be increased by moving the connector pin 54 toward the center of the diaphragm.

The upper conductor strip or electrode 130 is in electrical contact with the housing 30 through the conductor ring 44 thereby being grounded to the body of the vehicle. The lower conductor strip 132b is spaced from the insulator ring 50 by a lug 56 which is clamped between the lower conductor strip 132b and the insulator ring 50. The lug 56 facilitates connection to the conductive element 84 of an insulated cable 86 for connection to the electric meter EM on the dashboard.

In order to achieve linear measurements of the pressure applied by the hydrostatic head of gasoline, the electrosensitive element 100 is prestressed by means of a bias spring 58. Bias spring 58 is secured on the gasoline containing side of housing 30 on the upper side of diaphragm 40 so as to impose a predetermined force on diaphragm 40 at the center of the diaphragm 40. The helical portion 59 of spring 58 is mounted on the walls of housing 30. The force applied by the spring to the diaphragm 40 is adjusted by turning the spring in the threads of the housing, thus moving the spring 58 towards or away from the diaphragm. Radial portion 60 of the spring 58 projects at an angle to the plane of helical portion 59 so that axial arm 61 of the spring 58 applies pressure to diaphragm 40. In this embodiment of the invention, the force applied by bias spring 58 to diaphragm 40 is such that the response of the electrosensitive element 100 to other pressures will be in the linear region as shown in FIG. 5, that is bias spring 58 applies a force to diaphragm 40 thereby prestressing the piezoresistive element 10 to a point near the low-conductance end of the resistivity range to be used. For example, employing an electrosensitive element of the type whose characteristic is represented in FIG. 5, the piezoresistive element 10 would be stressed an amount corresponding to about 10 grams when the gasoline tank is empty. Therefore, as the hydrostatic head on the diaphragm 40 increases, the piezoresistive element 10 is compressed more and more, causing the conductance to change in proportion to the change of hydrostatic head. With a gasoline tank of uniform cross section, this means that electric current flowing in the electric meter EM is a linear function of the amount of gasoline in the tank.

A simple circuit for producing an electrical signal proportional to the force applied to the electrosensitive unit 100, such as the head applied to the diaphragm of the pressure sensor PS, is shown in FIG. 8. In this case, the piezoresistive element 10 of the pressure sensor PS is connected in series with an electric meter EM mounted on the dashboard of an automobile, the battery T of the automobile, and the ignition switch G. The electric meter EM is calibrated to indicate extreme points such as "E" for empty and "F" for full. Between those points the indications are nearly linearly distributed.

More particularly, one electrode 135 of the electrosensitive unit 100 is in electrical communication with the metal housing 30 which in turn is in electrical connection with the tank and chassis of the automobile. The other terminal 132b is connected to a lug 56 which is insulated from the housing 30 by means of the insulating ring 50. The lug 56 is connected to a single insulated conductor 84 which connects through the electric meter EM and the ignition switch G to the positive terminal of the battery T. The negative terminal of the battery T is connected to the chassis thereby completing the electric circuit. The electric meter is one which has a pointer which deflects an amount proportional to the magnitude of the current flowing therethrough. A suitable meter is one having a D'Arsonval movement.

In some cases, it is desirable to set the zero point of the electric meter with the empty position "E" at such a point that an indication of "empty" is given when a small amount of gasoline, such as 1 or 2 gallons still remains in the tank. In this case, the head 2 gallons of gasoline may establish the prestress applied to the diaphragm 40 instead of employing a spring 58. This is particularly applicable where a gasoline tank is employed which is of uniform cross section throughout its height except in a small portion at the top and bottom where the tank is curved. It is to be understood that the invention may be useful with tanks which are not of uniform cross section, especially where the head of the fluid rather than its volume is of interest.

In FIG. 9 there is shown an arrangement for measuring the head H of liquid in a sealed tank K. In this case the portion 31 of the housing 30 which contains the electrosensitive element 100 is sealed. The electrical conductor that connects with the voltmeter EM on the dashboard is insulated from the housing 30 such as by means of an insulating bushing 85.

In order to actively measure the head of the liquid L irrespective of the pressure of air A or other gas above the liquid, a tube B connects the chamber 31 with the air space at the top of the tank K.

It is also possible to measure absolute pressure. This may be done, for example, by filling the space 31 with inert gas such as argon at low pressure and sealing the port 90 instead of connecting a tube B thereto.

By employing a pressure sensor of the type described herein in which a resilient diaphragm responsive to pressure is utilized to produce an actuating force corresponding to the pressure on a piezoresistive semiconductor element which is biased to exhibit a conductance that is a linear function of the actuating force over a range of compression forces, an electromechanical transducer may be provided which has an enlarged linear range of response and a high degree of reliability.

In order to render the pressure sensor of this invention highly linear in conductance over a wide temperature range, account is taken of the fact that the gauge factor as well as the conductance is a function of temperature. More particularly, a piezoresistive element made from the special material described herein with the crystal mounted with the [111] plane perpendicular to the longitudinal axis, has a gauge factor that has a negative temperature coefficient and a conductance that has a positive temperature coefficient in the linear range. Furthermore, this special material has temperature coefficients of gauge factor and conductance which compensate for each other nearly completely at full load, for example, when the gasoline tank on which it is installed, is full. For this reason, at full load, the current flowing through the semiconductor element is nearly constant over a wide atmospheric temperature range likely to be encountered. Though the temperature coefficients do not compensate each other fully at smaller loads, the percentage error caused by wide temperature changes at such loads is only a small percentage of the full-load reading.

It will be understood, of course, that advantage may be taken of this feature of my invention by utilizing a piezoresistive element in which the temperature variations of the gauge factor and the temperature variations of conductance oppose each other to maintain the ratio of conductance to applied force nearly constant at at least one value of applied force within or near the range of linearity of conductance. In this way the ratio of conductance to applied force may be rendered substantially independent of temperature and applied force over a substantial part of the range of linearity of conductance.

In the best embodiment of the invention, when the value of the applied force is in the upper third of the range of operation, the temperature coefficients are such that they nearly compensate fully for each other. In other words, the temperature variations of gauge factor and conductance produce nearly equal and opposite effects at at least one point of operation within the range of applied force. Under such conditions the ratio of conductance to applied force has a very low or zero temperature coefficient so that a change in temperature produces substantially no change in the resistance of the piezoresistive element. With such compensation, the meter reading is about the same (having less than about 5 percent or 10 percent error) over a wide range of atmospheric temperature.

It will, of course, be understood that the invention is not limited to the exact construction described herein, but that the transducer of this invention may be embodied in many other forms and shapes and may be subjected to the forces produced by physical phenomena other than pressure.

The invention claimed is:

1. In a device for measuring a change in magnitude of a physical phenomenon wherein a change in the phenomenon changes a force applied to a semiconductor piezoresistive element, the improvement wherein said piezoresistive element exhibits a conductance that is a linear function of the applied force over a range of forces, means for stressing said element in proportion to such forces to vary the conductance in that range,
   the semiconductor piezoresistive element being doped with boron and with gold.

2. In a device for measuring a change in magnitude of a physical phenomenon wherein a change in the phenomenon changes a force applied to a semiconductor piezoresistive element, the improvement wherein said piezoresistive element is of a single conductive type that exhibits a conductance that is a linear function of the applied force over a range of forces, means including a resilient member prestressing said piezoresistive element an amount to produce a conductance in that range in the absence of such applied force.

3. In a pressure sensor, a resilient diaphragm responsive to pressure of a fluid to produce a corresponding actuating force, a semiconductor piezoresistive element that exhibits a conductance that is a linear function of an applied force over a range of forces, means for applying a force proportional to said actuating force to said semiconductor element, and means including a resilient member for prestressing said piezoresistive element to produce a conductance in that range in the absence of an applied force.

4. In a device for measuring a change in magnitude of a physical phenomenon, comprising:
   a unitary piezoresistive semiconductor element of a conductivity type and having a conductance that is a linear function of an actuating force within one force range but not in another force range;
   means for resiliently prestressing the semiconductor element to set the semiconductor element in a strain condition within said one force range, and
   means responsive to the physical phenomenon for applying a corresponding force to the semiconductor element whereby the resultant change in conductance is proportional to the change in magnitude of said phenomenon.

5. In a measuring device as defined in claim 4, circuit means including a constant voltage source and a current-measuring device connected in series with each other and said unitary piezoresistive element for measuring the change in current flowing through said piezoresistive element in response to said applied force, whereby the change in magnitude of said phenomenon is indicated.

6. In a pressure sensor for measuring changes in pressure comprising:
   a housing having a flexible diaphragm sealingly mounted on one side thereof;
   a unitary piezoresistive semiconductor element mounted within the housing, said semiconductor element being of a single conductivity type;
   a mechanical linkage connecting the diaphragm with said semiconductor element whereby pressure acting on the diaphragm applies a force to said semiconductor to cause said semiconductor element to be strained in a corresponding amount;
   said semiconductor element having a conductance that is a linear function of applied force within one force range but is not a linear function of force in some other force range, and
   means for resiliently prestressing the semiconductor element independently of such pressure to establish a strain in the semiconductor element corresponding to a force within said one force range.

7. A pressure sensor as defined in claim 6 wherein the prestressing means comprises a bias spring mounted to apply a prestressing force to the semiconductor element.

8. A pressure sensor for measuring changes in pressure comprising:
   a housing having a flexible diaphragm sealingly mounted on one side thereof;
   a piezoresistive semiconductor element mounted within the housing, said piezoresistive semiconductor element comprising a single crystal of silicon which is doped with boron and gold;

a mechanical linkage connecting the diaphragm with said semiconductor element whereby pressure acting on the diaphragm applies a force to said semiconductor to cause said semiconductor element to be strained in a corresponding amount;

said semiconductor element having a conductance that is a linear function of the applied force within one force range but is not a linear function of force in some other force range, and means for prestressing the semiconductor element independently of such pressure to establish a strain in the semiconductor element corresponding to a force within said one force range, said prestressing means comprising a bias spring mounted to apply a prestressing force to the semiconductor element.

9. In a device for measuring a change in magnitude of a physical phenomenon, means responsive to a change in said phenomenon to produce a corresponding actuating force, a semiconductor piezoresistive element that exhibits a conductance that is a linear function of an applied force over a range of forces, and means for applying a force proportional to said actuating force to said semiconductor element, said piezoresistive element having a gauge factor that has a temperature coefficient of one sign and a conductance that has a temperature coefficient of the opposite sign, temperature variations of the gauge factor and temperature variations of conductance opposing each other, to maintain the ratio of conductance to applied force substantially independent of changes in temperature and applied force over a substantial part of the range of linearity of conductance.

10. A measuring device as defined in claim 9 wherein said temperature variations of gauge factor and conductance produce nearly equal and opposite effects at a point of operation in the upper third of the range of applied force.

11. In a device for measuring a change in magnitude of a physical phenomenon, means responsive to a change in said phenomenon to produce a corresponding actuating force, a semiconductor piezoresistive element doped with boron and with gold that exhibits a conductance that is a linear function of an applied force over a range of forces, and means for applying a force proportional to said actuating force to said semiconductor element.

* * * * *